Aug. 29, 1961  H. R. FISCHER  2,998,169
POURING SPOUT
Filed June 24, 1959  2 Sheets-Sheet 1
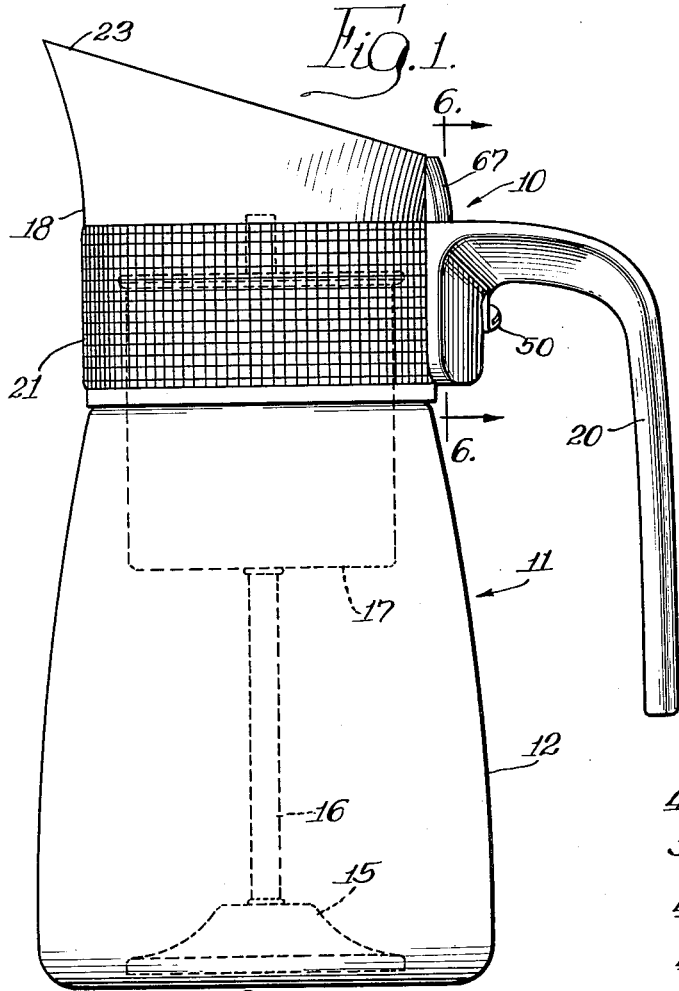
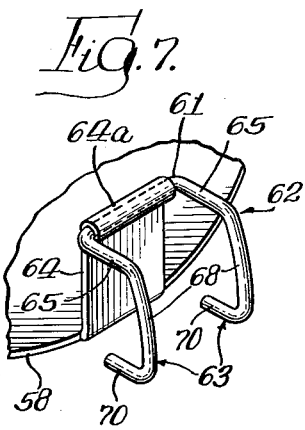
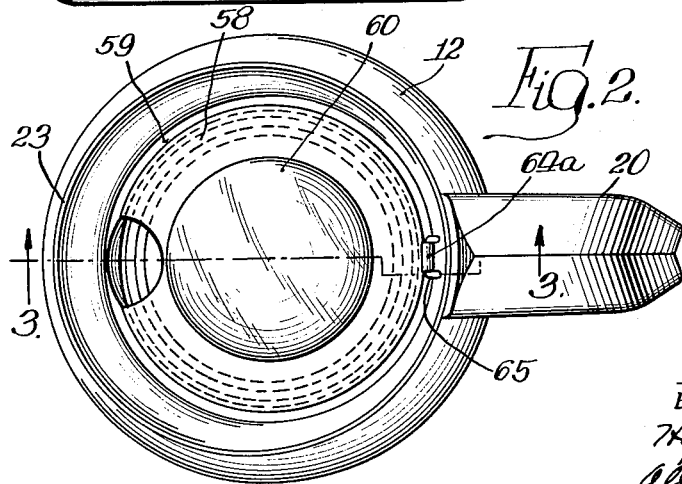
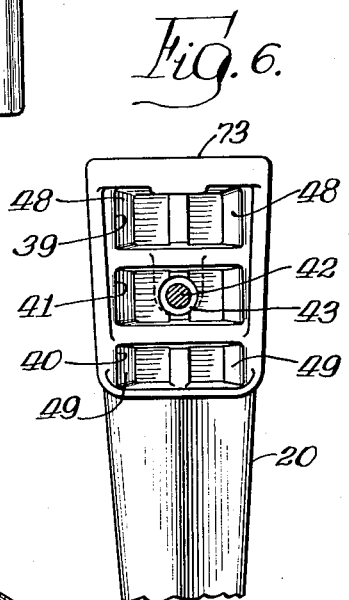
INVENTOR.
Henry R. Fischer,
BY Aug. 29, 1961  H. R. FISCHER  2,998,169
POURING SPOUT
Filed June 24, 1959  2 Sheets-Sheet 2
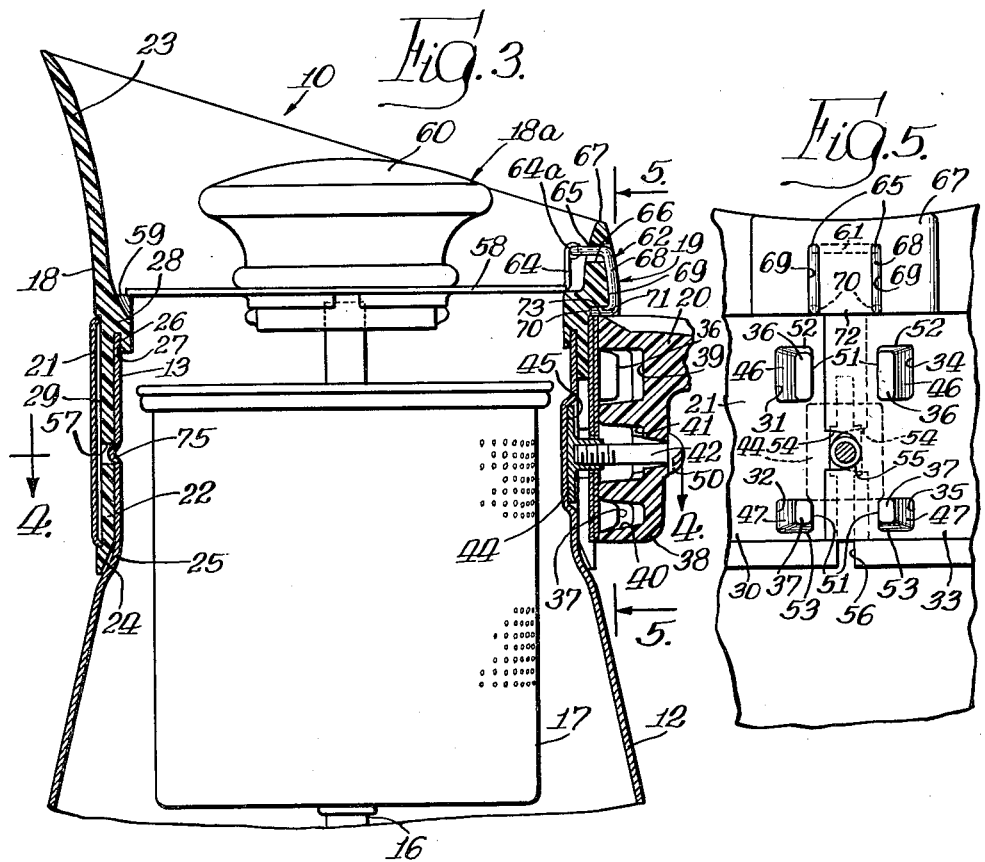
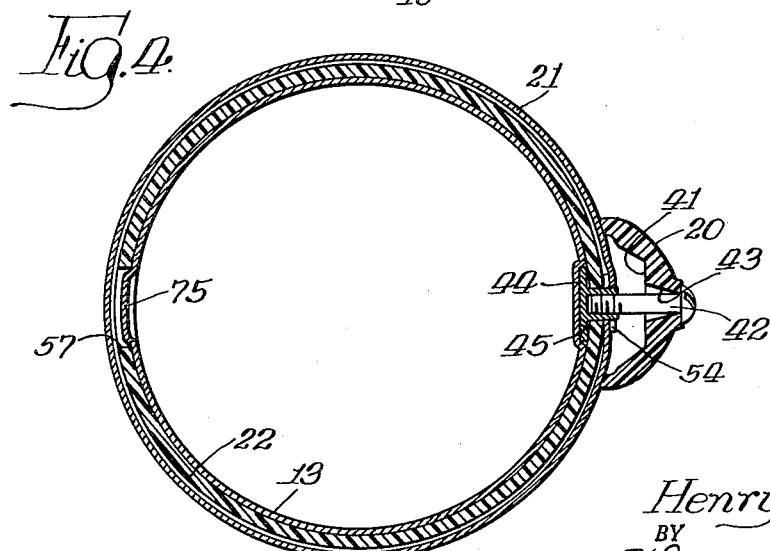
INVENTOR.
Henry R. Fischer,
BY

United States Patent Office 2,998,169
Patented Aug. 29, 1961

2,998,169
POURING SPOUT
Henry R. Fischer, Mount Prospect, Ill., assignor to Cory
Corporation, a corporation of Delaware
Filed June 24, 1959, Ser. No. 822,489
12 Claims. (Cl. 222—475)

This invention relates to beverage preparing devices and in particular to pouring spouts for use therein.

The principal object of the instant invention is to provide a new and improved pouring means arranged for association with the tubular outlet forming means of a beverage preparing device container.

Another object is to provide such a pouring means having new and improved closure means.

A further object is to provide such a pouring means having new and improved associated handle means for manipulating the container as desired.

Still another object is to provide such a pouring means wherein the associated handle means co-operates with the closure means in a new and improved manner to retain the closure means in pivotal association with the beverage preparing device.

Other features and advantages of the invention will be apparent from the following description, taken in connection with the accompanying drawing wherein:

FIGURE 1 is a side elevation of a beverage preparing device provided with pouring means embodying the invention;

FIGURE 2 is a plan thereof;

FIGURE 3 is an enlarged, fragmentary vertical section taken substantially along the line 3—3 of FIGURE 2;

FIGURE 4 is a horizontal section taken substantially along the line 4—4 of FIGURE 3;

FIGURE 5 is an enlarged, fragmentary vertical section taken substantially along the line 5—5 of FIGURE 3;

FIGURE 6 is an enlarged, fragmentary vertical section taken substantially along the line 6—6 of FIGURE 1; and FIGURE 7 is an enlarged, fragmentary isometric view of a portion of the closure means.

As best seen in FIGURE 1 of the drawing, a pouring means 10 embodying the invention is mounted on a beverage preparing device 11 herein comprising a percolator. The percolator is illustratively of substantially conventional construction, being provided with a liquid-holding container portion 12 and an upwardly opening, tubular, outlet forming portion, or neck, 13 (FIGURE 3). Percolator 11 may be provided with a conventional percolating means 14 including a steam dome 15 carried on the bottom of container portion 12, a tubular stem 16 extending upwardly from steam dome 15, and a basket 17 concentrically on the stem 16 and extending upwardly to within tubular outlet 13.

Pouring means 10 comprises a tubular spout 18 sealingly secured to and extending upwardly from neck 13 of the percolator. At times, such as during a percolating operation, it is desirable to close the outlet, and for this purpose, the pouring means is provided with a closure member 18a pivotally carried on the spout 18 for movement between a closed position wherein the closure member extends transversely across the spout, and an open position permitting dispensing of beverage through the spout as desired. New and improved means 19 are provided for effecting the pivotal mounting of the closure member on the pouring spout, a detailed description thereof being set forth hereinafter.

To permit manipulation of the percolator as desired, a handle 20 is secured to neck 13. The handle is arranged to cooperate with pouring means 10 to provide tight secured relationship therebetween, as will be brought out more fully hereinafter. Also cooperating with handle 20 and pouring means 10 in a new and improved manner is a decorative band 21 concentrically surrounding the pouring means radially outwardly of neck 13. The instant invention comprehends a cooperating structural relationship of pouring spout 18, closure member 18a, pivot means 19, handle 20 and band 21 facilitating assembled installation thereof on percolator outlet 13 yet which assures a secure, non-leaking arrangement.

More specifically, as best seen in FIGURE 3, pouring spout 18 comprises a plastic tubular member having a cylindrical portion 22 concentrically surrounding percolator neck 13, and a pouring lip portion 23 extending upwardly from the cylindrical portion 22 for directing flow during a dispensing of beverage from the beverage preparing device 11. The lower end 24 of cylindrical portion 22 is interiorly chamfered to provide clearance with the outwardly flaring upper end 25 of percolator container portion 12 and permit spout 10 to be moved downwardly over neck 13 sufficiently to receive the upper end 26 of the neck sealingly in a downwardly opening groove 27 in a radially inwardly extending flange 28 at the juncture of spout portions 22 and 23. This assures that liquid, such as condensate, will drip back into container portion 12 from the lower end of flange 28 rather than pass downwardly between the outer surface of neck 13 and the inner surface of spout portion 22 which would result in an unsightly and unsanitary collection of the beverage on the external surface of container portion 12.

To facilitate alignment of band 21 with cylindrical portion 22 of the spout, and to permit a somewhat more flush arrangement of the band on the spout, cylindrical portion 22 is provided with an outwardly opening, shallow annular recess 29 in which band 21 is received. To secure the band concentrically around spout portion 22 in recess 29, one end 30 of the band is provided with vertically spaced cutouts 31 and 32 and the other end 33 of the band is provided with a corresponding set of vertically spaced cutouts 34 and 35. Extending rearwardly from spout cylindrical portion 22 is a pair of circumferentially spaced upper lugs 36 and a pair of circumferentially spaced lower lugs 37. With the band ends 30 and 33 overlapped, as seen in FIGURE 5, band end 30 hooks over one set of lugs 36 and 37 and band end 33 hooks over the other set of lugs 36 and 37 so as to maintain the band drawn tightly around spout portion 22 in recess 29.

As best seen in FIGURE 3, ends 30 and 33 of band 21 are prevented from moving outwardly from lugs 36 and 37 by handle 20. More specifically, handle 20 includes a connecting block portion 38 having an upper recess 39 receiving lugs 36, a lower recess 40 receiving lugs 37, and a middle recess 41. A screw 42 passes freely through a tapered bore 43 in block portion 38 aligned with recess 41, and through recess 41 to engage threadedly a T-nut 44 secured, as by soldering or welding, to percolator outlet 13 in a complementary recess 45. The circumferentially outer faces 46 of lugs 36 and the circumferentially outer faces 47 of lugs 37 are inclined toward a vertical plane bisecting the space between the respective lugs 36 and lugs 37, and handle recesses 39 and 40 are provided with corresponding inclined end surfaces 48 and 49 respectively for wedging engagemnet by surfaces 46 and 47. Thus, when screw 42 is threaded into nut 44, the head 50 of the screw bears against handle block portion 38 surrounding bore 43 and forces the block portion into tight secured relationship with the respective lugs. The inner surfaces 51 of the lugs 36 and 37 preferably extend in vertical radial planes (relative to the axis of cylindrical portion 22) to facilitate retention of the band ends in engagement therewith. To facilitate installation of the handle block portion over the lugs, the upper surfaces 52 of upper lugs 36 and the lower surfaces 53 of the lower lugs 37 may be inclined outwardly toward a horizontal plane bisecting the space between upper lugs 36 and lower lugs 37. To permit screw 42 to pass through the overlapping band ends 30 and 33, the ends are provided with corersponding rectangular notches 54 which, when the band ends are overlapped, cooperatively define a square-shaped space 55 through which the screw may freely pass.

Clearance between T-nut 44 and the cylindrical portion 22 of the pouring spout as it is moved downwardly over the percolator outlet 13 to the position of FIGURE 3 is provided by a slot 56 in portion 22 extending upwardly from lower end 24. Diametrically opposite the slot 56, the cylindrical portion is provided with a hole 57 arranged to receive a nib 75 projecting outwardly from the forward portion of the percolator outlet 13, for releasably retaining the pouring spout on the percolator outlet.

As discussed briefly above, pouring means 10 includes means for selectably closing the outlet, comprising a closure member 18a. More specifically, the closure member 18a comprises a disc 58 removably seated on an annular radial shoulder 59 defining the upper end of flange 28. Co-axially secured to disc 58 is a knob 60 received substantially fully within the upwardly extending pouring portion 23 of the spout. The closure disc is pivotally mounted on a transverse portion 61 of a U-shaped clip 62 having a pair of C-shaped legs 63. As best seen in FIGURE 7, the rear end of closure disc 58 is provided with an upstanding flange 64 terminating in an upper curled end 65 through which clip portion 61 freely extends. Each of the clip legs 63 includes an upper horizontal portion 65 extending from transverse portion 61 through corresponding holes 66 in a thickened rear portion 67 of the pouring lip 23. The downwardly extending portions 68 of leg 63 are received in vertical grooves 69 opening outwardly in thickened portion 67. The inturned lower horizontal portion 70 of each leg 63 is received in a downwardly opening groove 71 in the bottom 72 of thickened portion 67 overhanging handle block portion 38. To lock the clip 62 in this position, handle block portion 38 is provided with an upper surface 73 which abuts the bottom 72 of thickened portion 67 to extend across the grooves 71. The overhanging relationship of thickened portion 67 to the block portion 38 serves further to cover the top edge of the handle so as to make the percolator more sightly and to preclude collection of material in the space between the handle block portion and the cylindrical portion of the spout.

The installation of pouring means 10 on percolator 11 is extremely simple. The spout is installed by moving cylindrical portion 22 thereof downwardly over container neck 13 until outlet upper end 26 is fully received in groove 27 of the flange 28, whereupon nib 75 snaps into hole 57 to secure the forward portion of the spout to the tubular outlet. Decorative band 21 is now installed in recess 29 and temporarily held in place by hooking engagement with lugs 36 and 37. Handle 20 is then installed by placing connecting block portion 38 thereof against the overlapping band ends 30 and 33 with lugs 36 and 37 being received in recesses 39 and 40 of the connecting block portion. Screw 42 is extended through bore 43 and recess 41 and threaded into nut 44, whereby head 50 of the screw urges the connecting block portion 38 of the handle forcibly toward the rear portion of neck 13. Thus, ends 30 and 33 of the band and cylindrical portion 22 of the spout are clamped forcibly between the connecting block portion and neck 13 to secure the handle, band, and spout to the neck. At the same time, surface 73 of the handle bears against the bottom 72 of the enlarged portion 67 of the spout to secure the clip 62 thereto and retain the closure member 18 in pivotal association with the spout.

Removal of the pouring means from percolator 11 when desired may be readily effected by a reversal of the above described steps of assembly.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a beverage preparing device having a container provided with an upwardly opening outlet-forming neck, a pouring means comprising: a tubular member having a cylindrical portion sealingly mounted on the neck, a pouring lip portion extending upwardly from the upper end of the cylindrical portion for directing the flow during a dispensing of beverage from the container, and an upright wall portion spaced from the pouring lip portion and provided with a pair of horizontally spaced apertures; a clip having a transverse portion inwardly of the wall portion and a pair of legs extending from opposite ends of the transverse portion outwardly through said apertures to adjacent the upper end of the cylindrical portion of the tubular member; means securing said legs against movement relative to the tubular member; and a closure member having a connecting portion pivotally associated with the transverse portion of the clip for pivoting the closure member alternatively to a closed position transversely across the tubular member and an open position permitting dispensing of beverage through the tubular member.

2. In a beverage preparing device having a container provided with an upwardly opening outlet-forming neck, a pouring means comprising: a tubular member having a cylindrical portion sealingly mounted on the neck, a pouring lip portion extending upwardly from the upper end of the cylindrical portion for directing the flow during a dispensing of beverage from the container, and an upright wall portion spaced from the pouring lip portion and extending horizontally outwardly to overhang a space outwardly adjacent the cylindrical portion, said wall portion being provided with a pair of horizontally spaced apertures; a clip having a transverse portion inwardly of the wall portion and a pair of legs extending from opposite ends of the transverse portion outwardly through said apertures and into said space to underlie said wall portion; means fixedly securing said legs to the lower end of said wall portion; and a closure member having a connecting portion pivotally associated with the transverse portion of the clip for pivoting the closure member alternatively to a closed position transversely across the tubular member and an open position permitting dispensing of beverage through the tubular member.

3. In a beverage preparing device having a container provided with an upwardly opening outlet-forming neck, a pouring means comprising: a tubular member having a cylindrical portion sealingly mounted on the neck, a pouring lip portion extending upwardly from the upper end of the cylindrical portion for directing the flow during a dispensing of beverage from the container, and an upright wall portion spaced from the pouring lip portion and extending horizontally outwardly to overhang a space outwardly adjacent the cylindrical portion, said wall portion being provided with a pair of horizontally spaced apertures; a clip having a transverse portion inwardly of the wall portion and a pair of legs extending from opposite ends of the transverse portion outwardly through said apertures and into said space to underlie said wall portion; a handle; means securing the handle to the container; means on the handle fixedly securing said legs to the lower end of said wall portion; and a closure member having a connecting portion pivotally associated with the transverse portion of the clip for pivoting the closure member alternatively to a closed position transversely across the tubular member and an open position permitting dispensing of beverage through the tubular member.

4. In a beverage preparing device having a container provided with an upwardly opening outlet-forming neck, a pouring means comprising: a tubular member having a cylindrical portion sealingly mounted on the outlet, a pouring lip portion extending upwardly from the upper end of the cylindrical portion for directing the flow during a dispensing of beverage from the container, and an upright wall portion spaced from the pouring lip portion and extending horizontally outwardly to overhang a space outwardly adjacent the cylindrical portion, said wall portion being provided with a pair of horizontally spaced apertures extending between an inner and an outer surface thereof, said outer surface and the bottom surface of said wall portion being provided with channels extending one each from each of said apertures; a clip having a transverse portion inwardly of the wall portion and a pair of legs having a first portion extending from opposite ends of the transverse portion outwardly through said apertures and a second portion received in a corresponding channel and into said space to underlie said wall portion; means engaging the second portion of said legs for securing said legs to the lower end of said wall portion; and a closure member having a connecting portion pivotally associated with the transverse portion of the clip for pivoting the closure member alternatively to a closed position transversely across the tubular member and an open position permitting dispensing of beverage through the tubular member.

5. In a beverage preparing device having a container provided with an upwardly opening outlet-forming neck: a pouring means comprising a tubular member having a cylindrical portion sealingly mounted on said neck, and a pouring lip portion extending upwardly from the upper end of the cylindrical portion for directing the flow during a dispensing of beverage from the container; a handle for manipulating the container as to effect dispensing of beverage therefrom, said handle having a connecting portion and a grasping portion; a first threaded element fixed to the outside of said neck, the axis of said element extending normally to the axis of said neck; a second threaded element engaging the connecting portion of the handle and cooperating with the first threaded element to secure the handle to the container; and means on said handle and tubular member preventing rotation of the handle about said element axis.

6. In a beverage preparing device having a container provided with an upwardly opening outlet-forming neck: a pouring means comprising a tubular member having a cylindrical portion sealingly mounted on the neck and provided with a radially extending opening, and a pouring lip portion extending upwardly from the upper end of the cylindrical portion for directing the flow during a dispensing of beverage from the container; a handle for manipulating the container as to effect dispensing of beverage therefrom, said handle having a connecting portion and a grasping portion; a first threaded element secured to the outside of said neck inwardly of the cylindrical portions of the tubular member and aligned with said opening of the pouring means; and a second threaded element engaging the connecting portion of the handle and cooperating with the first threaded element to secure the handle to the container, at least one of said threaded elements extending through said opening of the pouring means, whereby the pouring means cylindrical portion is clampedly secured between said neck and said handle connecting portion.

7. The means of claim 6, wherein the element secured to the outlet extends outwardly through said opening, and said opening comprises a slot extending from the bottom of the cylindrical portion.

8. In a beverage preparing device having a container provided with an upwardly opening outlet-forming neck: a pouring means comprising a tubular member having a cylindrical portion sealingly mounted on the neck, and a pouring lip portion extending upwardly from the upper end of the cylindrical portion for directing the flow during a dispensing of beverage from the container; a handle for manipulating the container as to effect dispensing of beverage therefrom, said handle having a connecting portion and a grasping portion; a first threaded element fixed to the outside of the outlet, the axis of said element extending normally to the axis of the outlet; and a second threaded element engaging the connecting portion of the handle and cooperating with the first threaded element to secure the handle to the container, one of said tubular member and said handle being provided with a lug projecting toward the other of said tubular member and handle, and the other of said tubular member and handle being provided with means defining a recess complementary to said lug, said lug tightly engaging the means defining said recess.

9. In a beverage preparing device having a container provided with an upwardly opening outlet-forming neck: a pouring means comprising a tubular member having a cylindrical portion sealingly mounted on the neck and provided with a plurality of outwardly projecting lugs, and a pouring lip portion extending upwardly from the upper end of the cylindrical portion for directing the flow during a dispensing of beverage from the container; a handle for manipulating the container as to effect dispensing of beverage therefrom, said handle having a connecting portion and a grasping portion, said connecting portion having a plurality of recesses complementary to said lugs; a first threaded element fixed to the outside of said neck, the axis of said element extending normally to the axis of said neck; and a second threaded element engaging the connecting portion of the handle and cooperating with the first threaded element to secure the handle to the container with said lugs tightly engaging the handle in said recesses.

10. The means of claim 9, including a pair of said lugs, the surface of each lug of said pair facing away from the other lug being inclined toward the other lug to form a wedge means cooperating with corresponding recess surfaces of the handle to retain the handle rigidly in association with the container.

11. The means of claim 9, including a split band concentrically surrounding the cylindrical portion of the tubular member, said band being provided adjacent each end thereof with an aperture complementary to said lugs, said lugs extending through said apertures to retain the band in encircling relationship to the cylindrical portion of the tubular member.

12. In a beverage preparing device having a container provided with an upwardly opening outlet-forming neck: a tubular pouring means on said neck and having a pair of circumferentially spaced, outwardly projecting lugs; a split band concentrically surrounding the tubular member and having an aperture in each of the confronting free ends of the band, said apertures being complementary to said lugs, said lugs extending through said apertures to retain the band in encircling relationship to the cylindrical portion of the tubular member; and a handle secured to said tubular pouring means and retaining the free ends of said split band in juxtaposition to said tubular member.

References Cited in the file of this patent

UNITED STATES PATENTS

| | | |
|---|---|---|
| 87,318 | Ballinger | Mar. 2, 1869 |
| 949,053 | Baron | Feb. 15, 1910 |
| 2,274,607 | Cohen | Feb. 24, 1942 |
| 2,546,040 | Murray | Mar. 20, 1951 |